United States Patent [19]

Purchase et al.

[11] Patent Number: 5,432,838
[45] Date of Patent: Jul. 11, 1995

[54] COMMUNICATION SYSTEM

[75] Inventors: F. Jack Purchase, Unionville; Ross A. Poole, Newmarket; James M. Law, Beeton, all of Canada

[73] Assignee: Ainsworth Technologies Inc., North York, Canada

[21] Appl. No.: 71,090

[22] Filed: Jun. 4, 1993

Related U.S. Application Data

[63] Continuation-in-part of Ser. No. 627,512, Dec. 14, 1990, abandoned.

[51] Int. Cl.⁶ .......................................... H04M 11/06
[52] U.S. Cl. ..................................... 379/55; 379/58; 455/55.1; 348/6; 348/12; 348/13
[58] Field of Search .................. 379/55, 56, 58, 63; 455/3.1–6.3, 7, 14, 15, 17, 20, 40, 53.1, 55.1, 103, 282; 348/6, 12–14; 333/126, 127, 132

[56] References Cited

U.S. PATENT DOCUMENTS

| | | | |
|---|---|---|---|
| 3,191,122 | 12/1961 | Hussey | 455/7 |
| 3,668,307 | 6/1972 | Face et al. | 455/6.3 |
| 3,916,311 | 10/1975 | Martin et al. | |
| 3,983,486 | 9/1976 | Rheinfelder | 455/14 |
| 4,375,622 | 3/1983 | Hollingsworth et al. | 333/126 |
| 4,495,495 | 1/1985 | Ormanns et al. | |
| 4,630,057 | 12/1986 | Martin | |
| 4,646,295 | 2/1987 | Basile | 455/3.1 |
| 4,774,481 | 9/1988 | Edwards et al. | 333/127 |
| 4,775,999 | 10/1988 | Williams | 379/59 |
| 4,777,652 | 10/1988 | Stolarczyk | |
| 4,870,697 | 9/1989 | Weber | |
| 4,879,755 | 11/1989 | Stolarczyk et al. | 455/40 |
| 4,953,198 | 8/1990 | Daly et al. | 379/63 |
| 4,972,505 | 11/1990 | Isberg | |
| 5,032,804 | 7/1991 | Hollingsworth | 333/132 |
| 5,115,463 | 3/1992 | Moldavasky et al. | 379/58 |
| 5,278,989 | 1/1994 | Burke et al. | 455/55.1 |

FOREIGN PATENT DOCUMENTS

| | | |
|---|---|---|
| 0181314 | 9/1985 | European Pat. Off. |
| 2391604 | 12/1978 | France |
| 656995 | 7/1986 | Switzerland |
| 2057818 | 4/1981 | United Kingdom |
| 2073552 | 10/1981 | United Kingdom |
| 2084430 | 4/1982 | United Kingdom |
| 2167924 | 6/1988 | United Kingdom |
| WO92/10883 | 6/1992 | WIPO |

OTHER PUBLICATIONS

Design of a Tunnel Relay System with a Leaky Coaxial Cable in an 800–MHz Band Land Mobile Telephone System by T. Suzuki et al. (IEEE Transactions on Vehiclar Technology, vol. VT–29, No. 3, Aug. 1980.
Television Transmission from a Train in Motion in Europe's First Air Cushion Subway by Fritz Weiss 9(1986)März/Apr., No. 2, Berlin, Germany.
Mine–Wide Information System Development at INCO Limited by G. R. Baiden & M. Scoble, Jun. 1991.
Telephony article: "Giving Telcos a competitive edge in total communications services", by Del Myers, Vol. 193, No. 26, Dec. 26, 1977.
Radio Systems for Underground Mines by D. J. R. Martin.

Primary Examiner—Curtis Kuntz
Assistant Examiner—Dwayne D. Bost
Attorney, Agent, or Firm—Bereskin & Parr

[57] ABSTRACT

A communication system, particularly for a mine, has a broad band distribution system. Antennas, which may comprise leaky coax feeders, are connected to this distribution system by interface units. As required, the interface units effect signal level adjustment, frequency translation, and/or modulation technique changes. It is provided for each of the distribution system and the antennas to have separate in- and out- bound broad band spectra, with the antenna typically utilizing different frequency bands from the distribution system. A variety of information, including mobile and fixed radio, LANs, data acquisition systems, video, can communicate over this system.

26 Claims, 10 Drawing Sheets

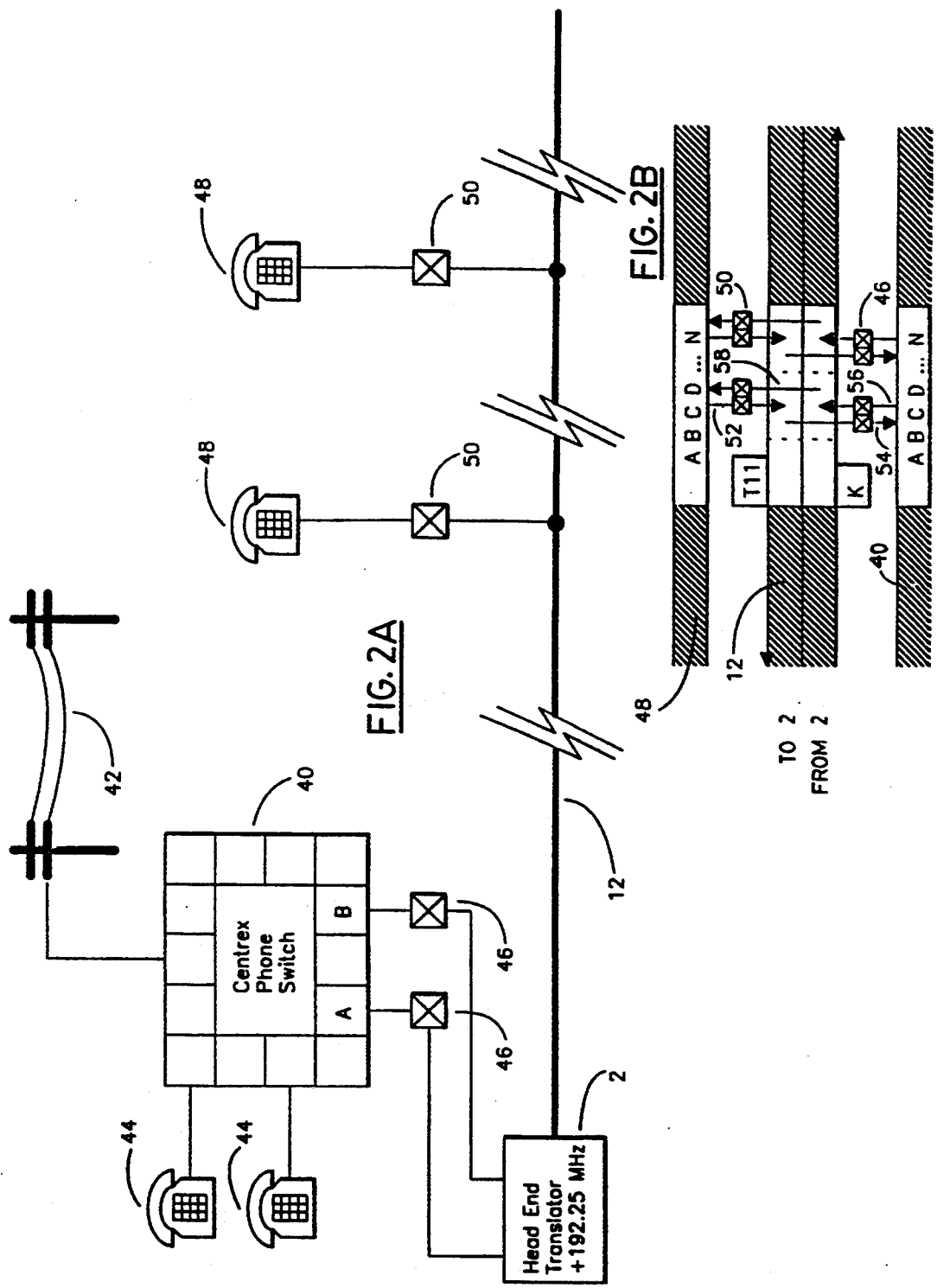

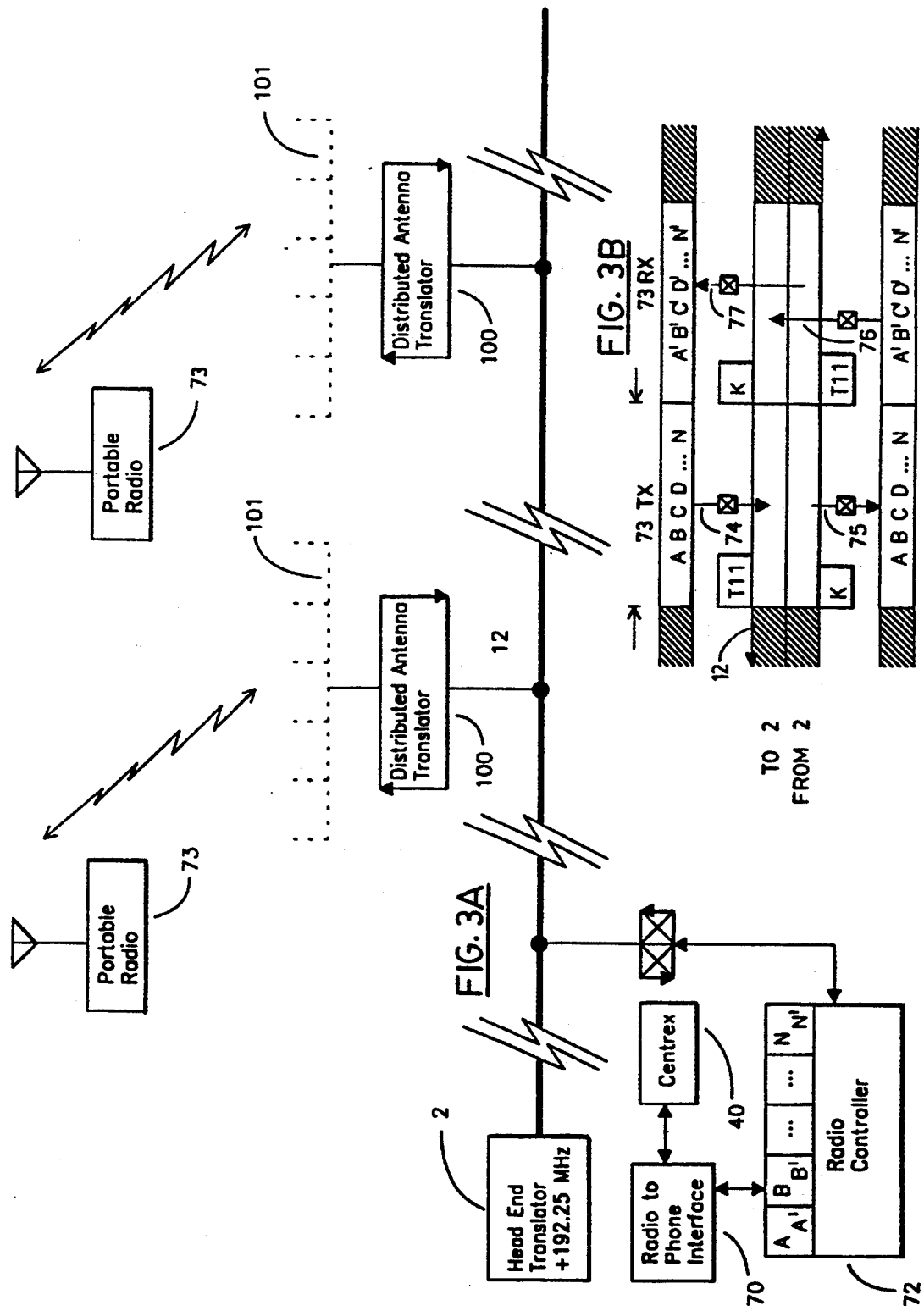

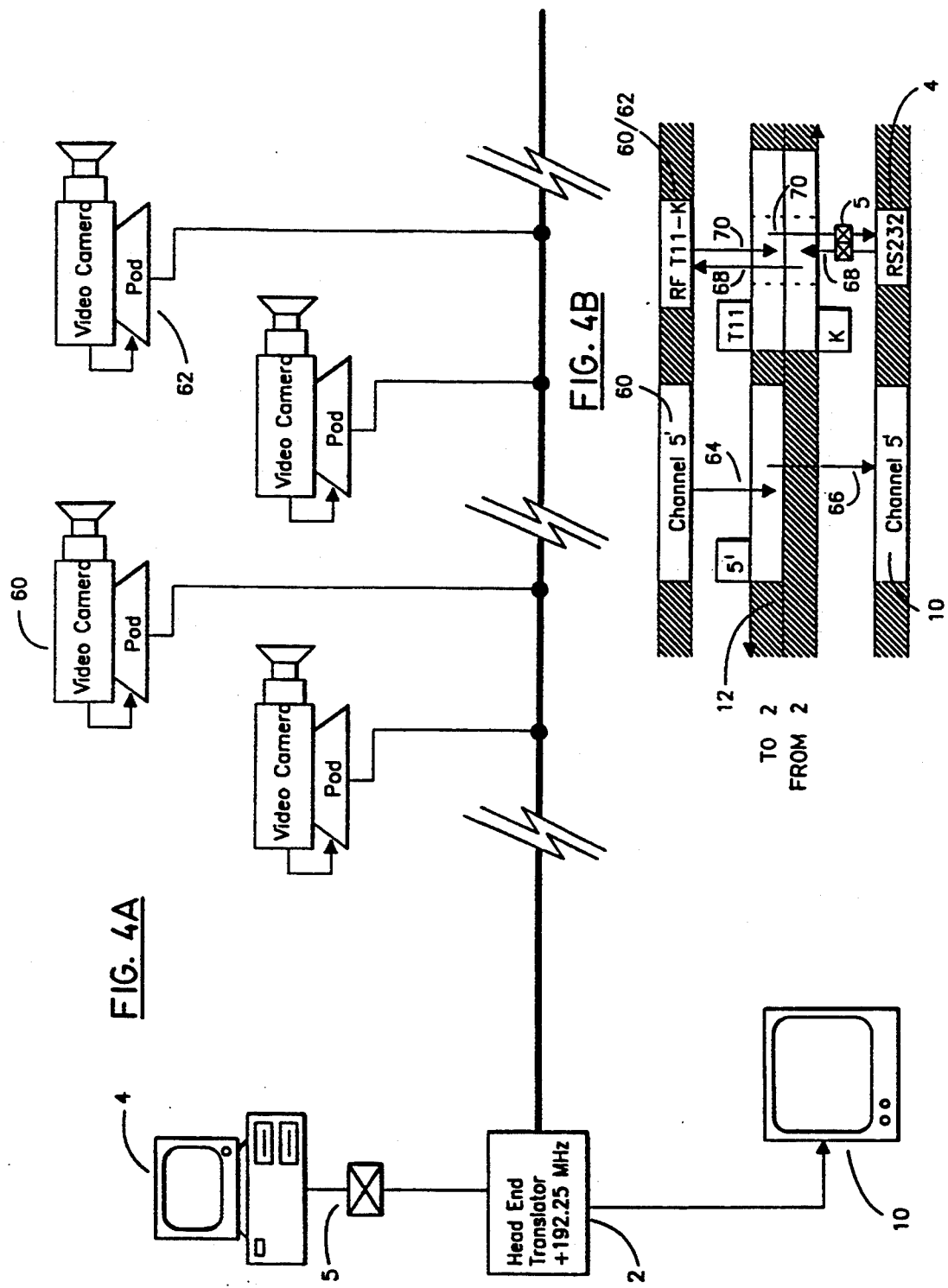

COMMUNICATION SYSTEM

CROSS-REFERENCE TO RELATED APPLICATION

This application is a Continuation-In-Part of our earlier application Ser. No. 627,512, filed Dec. 14, 1990, now abandoned.

FIELD OF THE INVENTION

This invention relates to a radio-based communication system. This invention more particularly relates to a radio-based communication system for use in an underground mine or any similar environment which is enclosed for radio transmission purposes, e.g. underwater.

BACKGROUND OF THE INVENTION

Despite recent rapid advances in communication technology, communications in underground mines have remained relatively crude and simple. In view of the environment and the possible dangers, there is a strong demand for a satisfactory communication system, but nonetheless mine communications are presently far from adequate.

Various communication systems have been proposed, based on radio communication. However, particularly where the mine is cut in a conducting ore body, there is no reasonable electromagnetic wave propagation through the ore body, and hence the only propagation that can be used is along individual tunnels, etc. Thus, the propagation of radio waves is quite different from surface operation. VHF radio equipment has been used in mines, but at best one can only obtain a range of a few hundred meters. If the transmitted power is increased, this does not have a great deal of effect on the range. Furthermore, it has to be borne in mind that in many mines, the transmitted power is severely limited. For example, because of the possible danger of accidentally setting off blasting caps, in many mines, the transmitted power is limited to one watt.

If higher transmission frequencies, for example in the UHF range are used, this may give improved range, but this is entirely on a line of sight basis. Any corner or even a slight bend in the tunnel becomes a complete barrier to transmission.

At very low frequencies, the order of a few hundred KHz, it is possible to obtain a form of radio communication, but this form of transmission has some serious limitations for personal communication systems because of the size of portable antenna required and the limited bandwidth available.

Accordingly, a solution that has been evolved to these transmission problems is the use of so-called "leaky feeders" or "leaky coax cable". A "leaky coax cable" is a special type of co-axial cable that has the property of carrying a radio signal over a considerable distance, but at the same time allowing a certain, designed amount of the signal to leak out along its length, so as to provide communication with radio sets in the vicinity. Here, the relevant vicinity is the cross section of the tunnel through which the cable passes. Thus, the distance over which the leaky coax cable has to transmit is never more than the width or diameter of the tunnel. It should also be appreciated that the reference to "leakage" is intended to cover both transmission from the cable, and also reception by the cable of a signal from an adjacent transmitter. The leaky coax cable can then be connected to a conventional base station which acts as the main receiver/transmitter. In this specification, including the claims, the term "leaky coax" or "leaky coax cable" denotes a co-axial cable having an outer conductive screen that is provided with openings or imperfections such that the leaky coax cable is capable of both receiving signals from and transmitting signals to the immediate vicinity of the cable, and it also encompasses any elongate antenna which has similar properties and can be configured to any desired shape. The openings could be provided by an open braid or spiral wrap screen, or by other openings in the outer shield of the cable.

Leaky coax cables have some limitations. By their very nature, if larger areas are to be covered, the signal transmitted along them has to be reinforced or amplified regularly. In current leaky coax cable systems, in-line amplifiers are inserted in the leaky coax cable at appropriate intervals, with power being supplied through the leaky coax cable itself. The amplifiers can then be spaced relatively close together, e.g. in the order of a few hundred meters, so that a relatively uniform signal strength can be maintained throughout a lengthy installation. This in turn enables the characteristics of the leaky coax cable to be relaxed, and relatively low efficiencies can be tolerated. It also enables the original signal injected into the leaky coax cable to be of a low level, meeting relevant mine safety standards.

Various types of leaky coax cable have been developed. One design consisted of a conventional co-axial cable, with portions of the external sheath removed. More recent configurations have a specially configured external sheath that only covers part of the exterior, so as to provide a controlled amount of leakage along its length.

Now, as any radio communication system usually requires two-way communication, this raises the problem of providing two-way amplification of the signals travelling in the two directions along the leaky coax cable. A variety of techniques have been developed to deal with this problem. In one, the system is essentially configured into a complete circle, so that all signals are always travelling in the same direction around the circuit, and eventually the signals arrives at their desired locations. This avoids the problem of having signals travelling in two directions.

Another technique that has been used is to transmit the two signals along the leaky coax cable at quite distinctly separate frequencies. Thus, in a so-called FD4 system, the signal frequency is divided by four at one end of the leaky coax cable and transmitted back along it. At the other end, the signal is multiplied by four before being transmitted back. This assures that there is a factor of four between the frequencies of the signals travelling in different directions. It is then a relatively simple matter to provide in-line amplifiers for signals travelling in the two directions, with the amplifiers having appropriate filters to ensure that they only amplify the desired signal. Such a system has been installed in a variety of locations with reasonable success.

A fundamental draw back and limitation to all these systems is that they essentially provide for one channel of communications, e.g. for a single frequency in each direction. Whilst suggestions have been made that a wide range of standard facilities and attachments can become available for data transmission and that the system can be extended beyond the surface of the mine, these systems fundamentally provide extremely restricted performance. This has, perhaps at least in part, resulted from radio practice for surface installations in free space. There, there are usually severe and detailed regulations concerning what frequencies one can use for radio communication, and in most countries and environments there is strong competition for use of available frequencies.

SUMMARY OF THE PRESENT INVENTION

Accordingly, at the present time, mine radio communication systems are, as compared to surface communication systems, simple and extremely restricted. At best, they provide for a very small number of voice channels.

With the increasing use of various electronic equipment, including various data gathering and control equipment, it is becoming increasingly desirable to provide a wide band communication system. Preferably, such a communication system should provide for a large number of voice channels, so as to enable virtually unrestricted communication within the mine and surface installations, much as is provided by a conventional telephone system or Local Area Network (LAN). Further, such a system desirably enables video, data and control signals to be readily transmitted throughout a mine and to main control units at a head end of the system or at other places in the mine.

Accordingly, in accordance with one aspect of the present invention, there is provided a communication system comprising: a non-radiating broad band distribution system having a plurality of connection points for transmission in a first outbound broad band spectrum and reception in a first inbound broad band spectrum, which are sufficiently spaced from one another to permit separate amplification thereof; a plurality of wide band antenna means, for transmitting and receiving a plurality of signals in a second outbound wide band spectrum and a second inbound wide band spectrum, each wide band antenna means comprising an elongate distributed antenna providing communication within an area having a configuration corresponding to the topology covered by the distributed antenna; means for maintaining signal levels in the broad band distribution system between desired limits; and a plurality of distributed antenna units, each connected between a respective connection point of the broad band distribution system and a respective wide band antenna means for bidirectional processing of signals therebetween;

wherein each distributed antenna unit comprises:

a main connection port connected to a respective connection point of the broad band distribution system; an antenna port connected to a respective wide band antenna means; a plurality of signal processing devices, for bidirectional processing of signals between the main connection and antenna ports and connected to the main connection port, each signal processing device being adapted to receive signals from and transmit signals to the main communication port in a first outbound frequency band and a first inbound frequency band respectively, and to receive signals from and transmit signals to the antenna port in at least one second inbound frequency band and at least one second outbound frequency band respectively, with each signal processing device being adapted to effect required translation in frequency, amplitude and modulation between the first and second inbound frequency bands and between the first and second outbound frequency bands, and with each signal processing device ensuring that each signal transmitted to the main communication port in the respective first inbound frequency band is at a desired level compatible with the broad band distribution system, and with the first inbound frequency bands all being in the first inbound frequency spectrum and the first outbound frequency bands all being in the first outbound frequency spectrum; and a frequency band splitter and combiner means connected between the signal processing means and the antenna port, the band splitter and combiner means being capable of combining signals in different frequency bands being transmitted to the antenna port and being capable of splitting frequencies received from the antenna port for separate processing by the signal processing means.

The distribution system could comprise conventional co-axial cable as used for cable television systems. Alternatively, it could comprise optical fibres or any other suitable broad band non-radiating transmission medium.

The wide band antenna means could comprise discrete antennas, but preferably comprises leaky coax cable segments. These leaky coax cable segments would be connected by the distributed antenna units to the distribution system. The provision of leaker coax cable segments as the wide band antenna means enables a variety of irregular topologies to be covered for reception and transmission.

It will be appreciated that, as is known, for broad band transmission throughout the broad band distribution system, signal levels must be compatible. In general, signal levels need to be in a 10–30 dB range; if any signal is below this range it will become lost or buried in noise, while signals greater than this range can cause intermodulation and interference problems. The absolute signal level in a particular system can vary, but for long distances and for very broad bandwidth signals, the range of allowable signal levels generally falls in a 10–30 dB range.

Where wireless radio transmission is employed, there can be a significant variation in the signal levels, e.g. of the order of 60 dB or more, depending on known factors, such as distance, frequency, topography, etc. Conventional systems overcome large variations in signal levels by limiting the number of carriers or bandwidth and/or by limiting the distance signals are transmitted.

In the present invention, the distributed antenna units provide an interface ensuring that adequate and tightly controlled signal levels are put onto the broad band distribution system, irrespective of the amplitudes of the signals received from an antenna. The distributed antenna units also effect any necessary translation between different frequencies and modulation characteristics of the broad band distribution system and of the radiated spectrum.

Preferably, the non-radiating broad band cable system comprises: a head end unit, for receiving signals in the first inbound broad band spectrum, and transmitting signals in the first outbound broad band spectrum, wherein the means for maintaining signal levels comprises a plurality of amplifier means located in the broad band distribution system at a plurality of corresponding locations, each amplifier means being capable of amplifying the first inbound broad band spectrum in one direction and amplifying the first outbound broad band spectrum in the other direction, whereby a plurality of separate channels may be transmitted in both directions along the distribution system.

Preferably, the broad band distribution system comprises a main trunk cable and branch cables, which have no significant leakage. Such cables are designed and configured to minimize leakage and losses.

Preferably, the wide spectrum antenna means comprises a plurality of leaky coax cable segments. More preferably it comprises one or more leaky coax trunk cables installed in main tunnels, and leaky coax branch cables in side tunnels. The overall length of the leaky coax cable segments is limited by the allowable cable losses, power losses to branches, coupling losses onto and off of the leaky coax cable, sensitivity of the receivers for acceptable operation of a given service, and allowable power levels at the transmitters for the services. Preferably, the topology of trunks and branches is selected to reduce the variation in signal levels between different areas of the tunnel system as well as providing adequate signal levels in all areas.

The interfacing means between the two cable systems, namely the radiating wide band leaky coax cables of the antenna and the non-radiating broad band distribution system, are distributed antenna translator units. Each unit preferably consists of a number of interfacing devices providing various services that use the cable systems to communicate. These devices are tailored to the type of signal transmission required to provide signals compatible with the transmission of the information or the service over the two differing cable systems. Many of the signals required for the non-radiating broad band cable distribution system are rigidly defined by industry convention as to allowable frequencies and required levels. As this is a self-contained system, other frequencies and levels could be used, but there are significant advantages to accepting industry standards as it permits direct connection to a variety of equipment. The signals required for the radiating wide band antenna system are largely dictated by the large variation in signal strengths encountered in any radio linked mobile communication link, and by the variations in signal propagation with respect to frequency for signals in the distributed antenna system and in the confines of the tunnels of a mine. Each distributed antenna translator, or DAT, thus must rationalize or translate signal levels, modulation characteristics and frequency bands for services ranging from narrow band FM type transmissions to wide band AM video type transmissions between the two environments. The limitations imposed on the allowable length and associated losses for the radiating broad spectrum antenna network are set to allow the successful transmission of wide bandwidth signals such as video services by ensuring adequate signal levels for good performance. The use of the non-radiating broad band cable system to link these limited area radiating services is critical, if wide bandwidth services are to be provided over large areas.

An important concept embodied in the present invention is the use of a wide band spectrum, irrespective of usual regulatory and other limitations. As such the invention can be employed in any enclosed environment that prevents significant RF leakage. Applications include underwater use and use in large buildings, or any other environment that, for radio transmission purposes, is enclosed.

BRIEF DESCRIPTION OF THE DRAWING FIGURES

For a better understanding of the present invention and to show more clearly how it may be carried into effect, reference will now be made, by way of example, to the accompanying drawings, in which:

FIG. 2a is a schematic view of a fixed telephone network incorporated into the communication system of the present invention;

FIG. 2b is a graphical representation of signal transfer in the telephone network of FIG. 2a;

FIG. 3a is a schematic view of a mobile voice communication network;

FIG. 3b is a graphical representation of the signal transfer in the voice radio network of FIG. 3a;

FIG. 4a is a schematic view of a fixed video monitoring network incorporated into the communication system of the present invention;

FIG. 4b is a graphical representation of signal transfer in the network of FIG. 3a;

FIG. 5b is a graphical representation of the signal transfer in the network of FIG. 5a.

Figure 6:
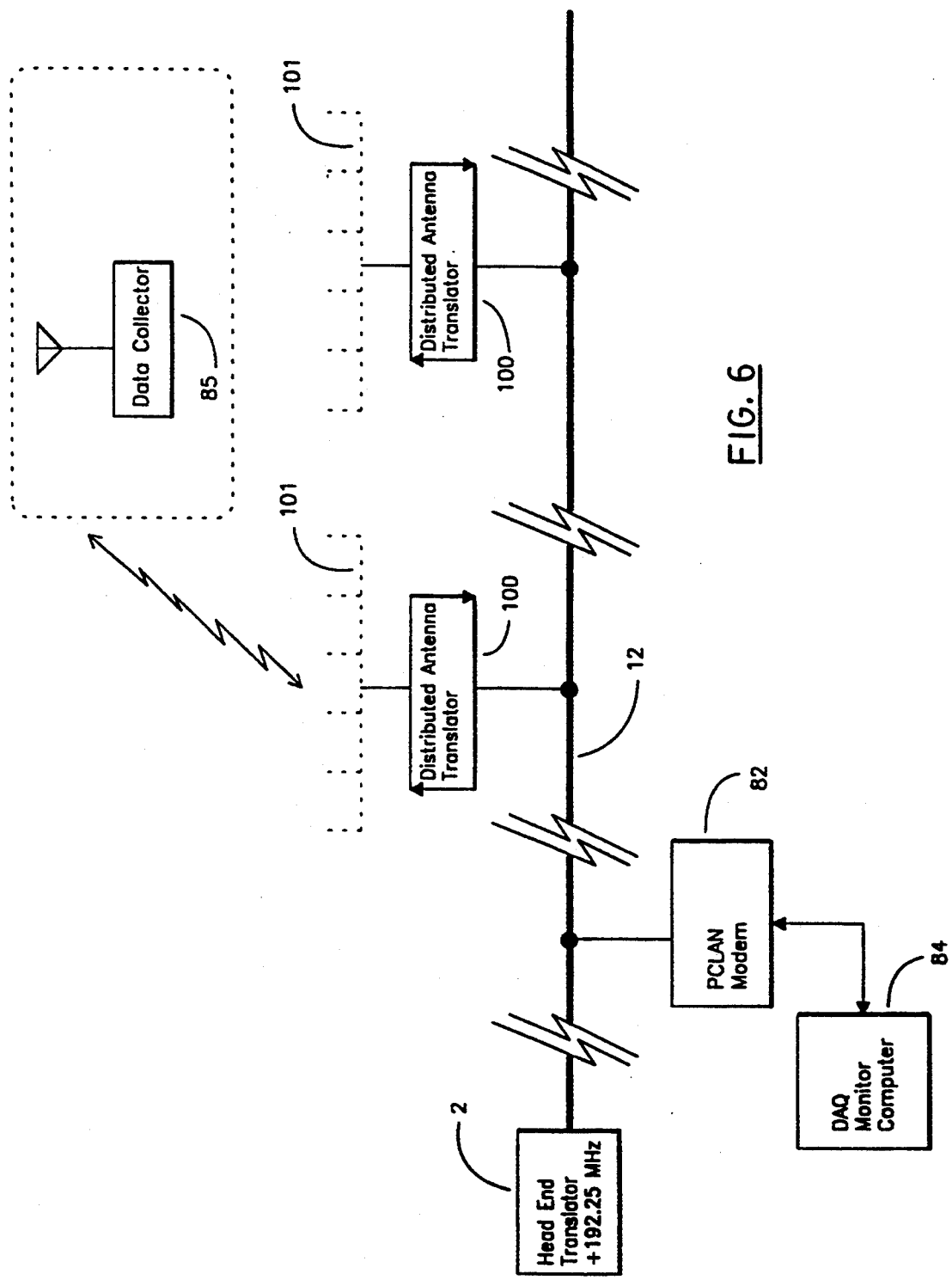
Figure 9:
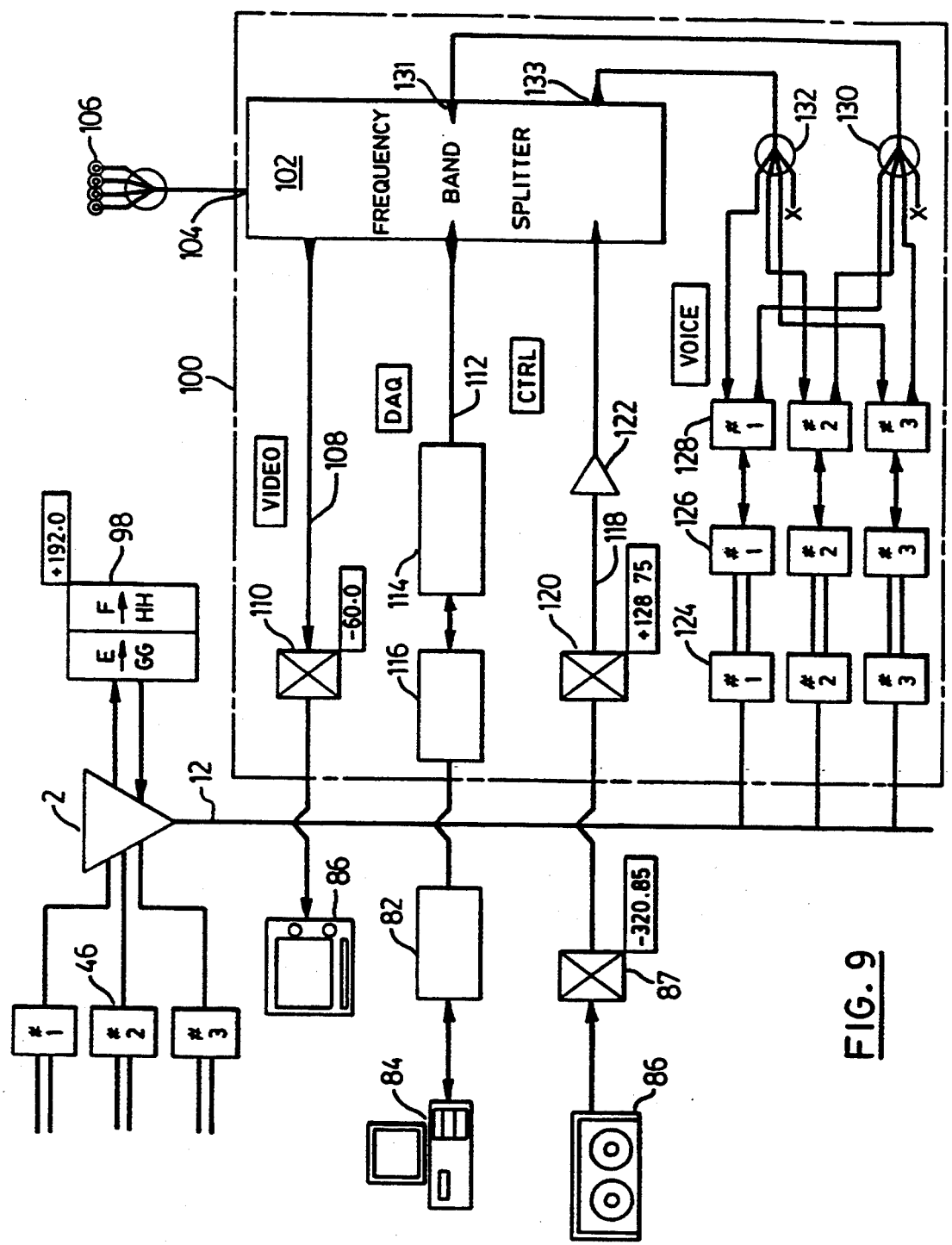
Figure 10:
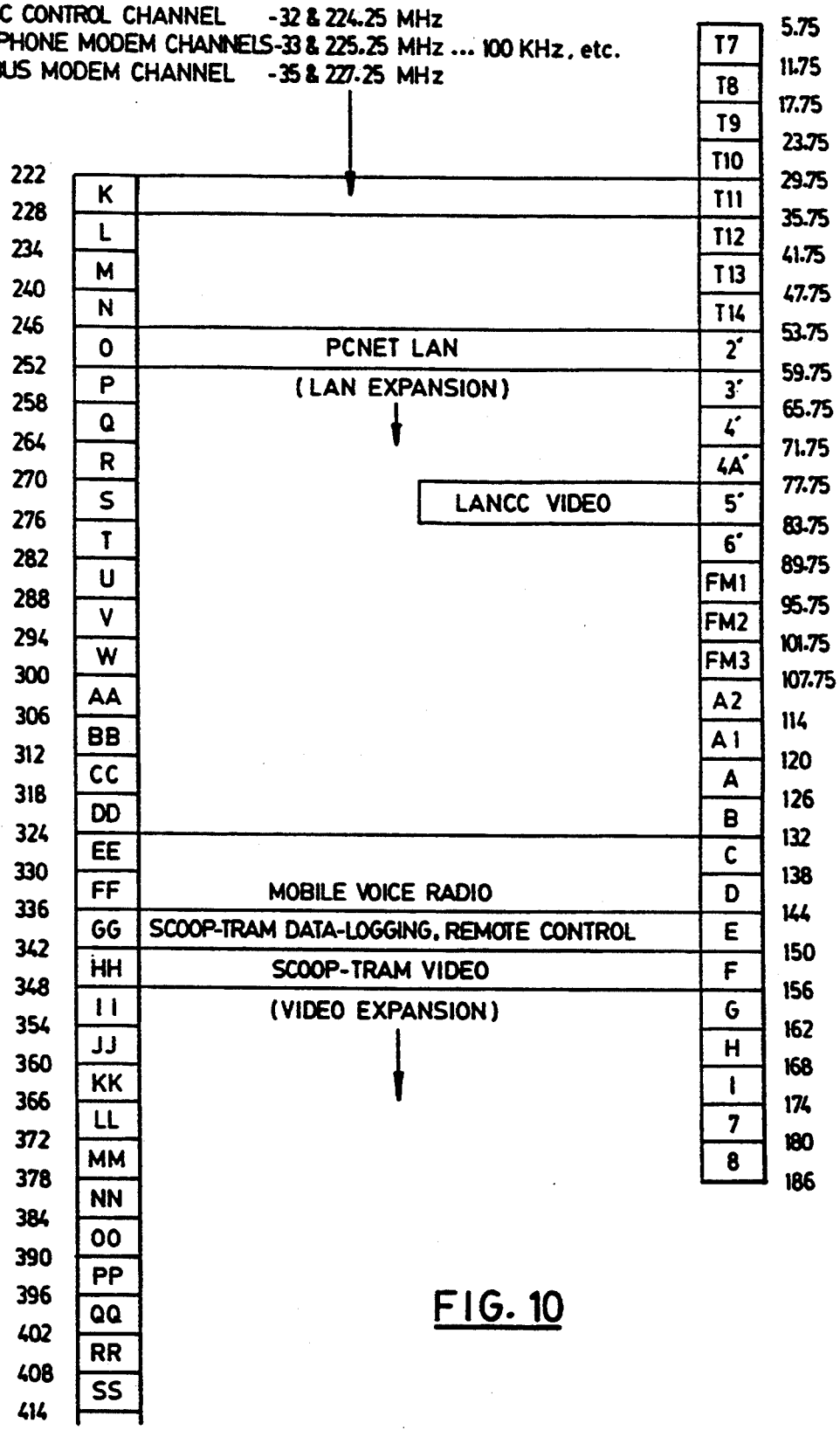

FIGS. 6; 7a, b; 8a, b show respective schematic views and graphical representations for the signal transfer, for a mobile mining vehicle mobile data logging network, a mobile mining vehicle mobile control network and a mobile mining vehicle mobile video network respectively;

FIG. 9 is schematic block diagram of the communication system of the present invention, showing a distributed antenna unit in detail;

FIG. 10 is a chart showing preferred channel allocations on the non-radiating broad band cable system in accordance with the present invention and industry convention.

DESCRIPTION OF THE PREFERRED EMBODIMENT

Figure 1:
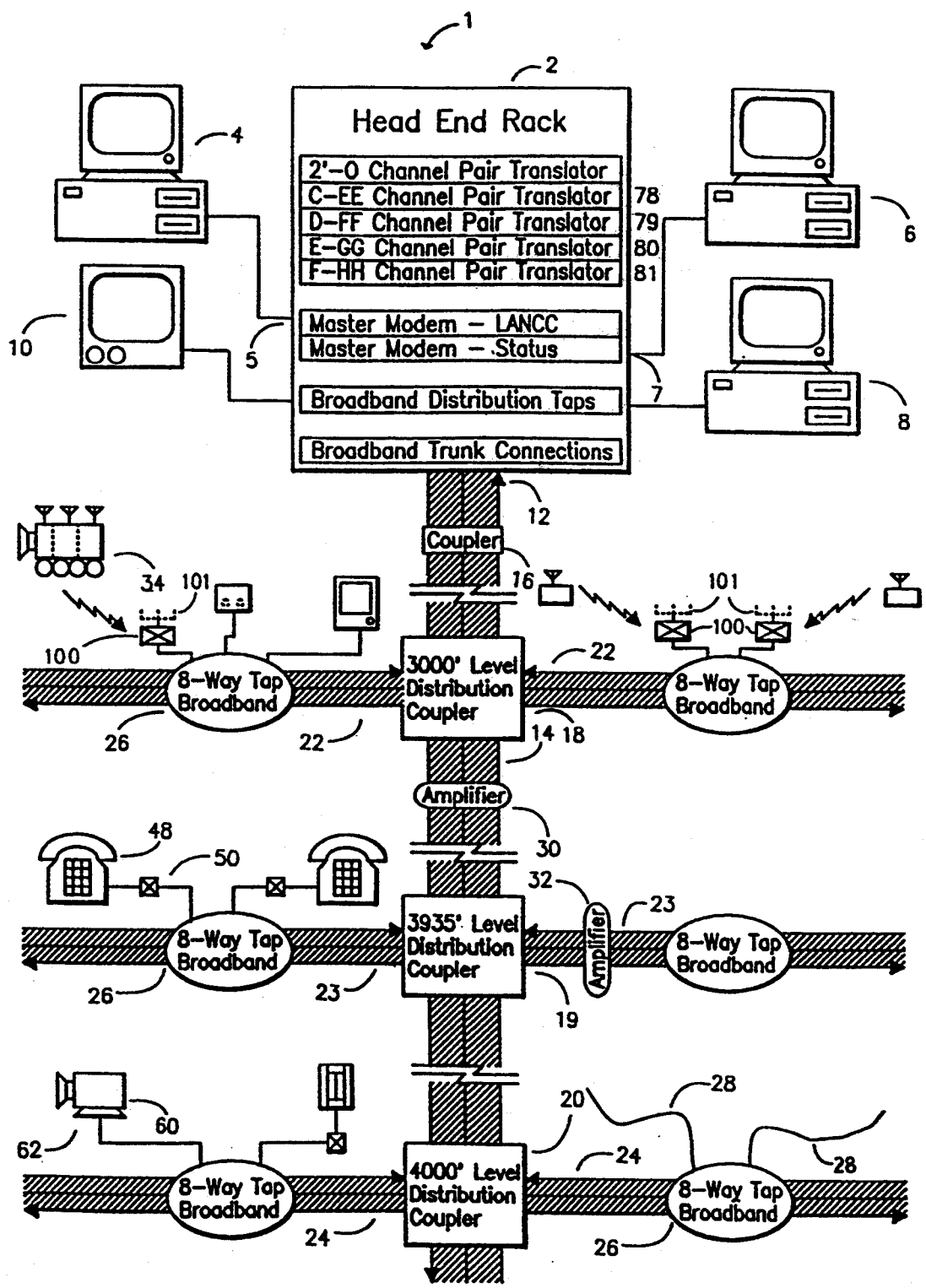
FIG. 1 is a schematic view of a communication system in accordance with the present invention.

Referring first to FIG. 1, the communication system as a whole is designated by the reference 1. The communication system 1 includes a head end unit 2. The head end unit 2 has a rack including various cards or circuits which are detailed below. The head end unit 2 is connected to a number of individual personal computers (PCs).

A first PC 4 is provided for fixed video surveillance control. A second PC 6 is provided for monitoring the status of a broad band transmission system, which is detailed below. A third PC 8 is connected to the head end unit 2, for use in controlling a non-mobile industrial LAN (Local Area Network), and also for a SCADA (Supervisory Control And Data Acquisition) system. The SCADA system is typified by an existing system based on DMACS, a software package produced by Intellution. Using different I/O drivers, the SCADA system is capable of communicating with many different kinds of PCs, and other equipment. Using data acquired from the various devices attached to the system, the SCADA system can generate real time graphical displays of the processes, etc. and alarm lists. In addition, the SCADA system can allow an operator to control remote machinery, by starting, stopping or varying device parameters. The operator can interact with the systems through a keyboard or touch screen monitor. This is detailed below in relation to FIG. 4. A surveillance television 10 is connected to the head end unit 2.

A non-radiating broad band transmission cable network or distribution system 12 is connected to the head end unit 2. This broad band cable network or distribution system 12 includes a main trunk cable 14, which in this preferred embodiment extends generally vertically downwardly into the mine through different distribution levels. Appropriate couplers 16 are provided at every level, to enable future access to be made to all levels. This cable network 12 and associated components are based on conventional broadband cable technology, as widely used in cable television systems, and uses many components used in such systems.

In FIG. 1, three levels are shown coupled to the main trunk cable 14, by appropriate couplers 18, 19 and 20. At each of these levels, branch cables 22, 23 and 24 are connected to the couplers 18–20.

The main trunk cable 14 and the branch cables 22, 23 and 24 comprise co-axial cable, configured to provide communication to the levels indicated, with minimum leakage and loss. For the main cable, P375-750JACASS.750 COMM/SCOPE co-axial cable is used, whilst for the branch or distribution cables 22, 23 and 24 P3-500JACASS COMM/SCOPE co-axial cable is used; equivalent cables could be used. All these cables are fully armoured and jacketed cables, designed to minimize any accidental damage. Maintaining the shielding integrity of the cable is essential to the electrical parameters of the system. Where possible, separation is maintained between the cable network 12 and high voltage cables. If possible, a communications corridor is established for the cable. All connectors installed on the cables are of integral sleeve type with heat shrink or pull shrink, to protect against moisture and corrosion.

RTM68 8-way broad band taps 26 are installed at regular intervals, to enable to drop cables 28 to provide a connection to points midway between the taps 26. Here, the taps 26 are shown spaced at 120 foot intervals, allowing 80 foot drop cables 28 to reach two midway positions. For unusual situations, the drop cables could be extended to 120 feet with the use of appropriate cabling.

As shown at 100 and as detailed below, distributed antenna units provide an interface with respective distributed antennas 101, which comprise a plurality of leaky coax cable segments.

As detailed below, there are first inbound and outbound broad band spectrums on the distribution system, for communication to and from the head end unit 2 respectively. Correspondingly, the distributed antenna units 101 have second inbound and outbound wide band spectrums for radio communication with different devices. Within each frequency spectrum, there are bands and channels for individual services. In this implementation, the first and second spectrums do not correspond with one another, and the distributed antenna units 101 provide for necessary translation.

The broad band cable network 12 is designed to meet current MAP/TOP specifications, and the proposed IEEE 802.7 standard. In order to meet this specification, it is necessary for signals to be placed onto the broad band cable network at a defined level controlled to within ±3 dB. The broad band cable network maintains the signal level, allowing, in general, no more than a 30 dB drop before reamplification, and presenting a signal at an output tap controlled to within ±6 dB of ideal specifications.

The cable network 12 will have automatic forward and reverse level controls maintaining stable signal levels, should temperature variations etc. affect cable properties along the system. In the main trunk cable 14, there are trunk amplifiers 30, which in this embodiment are C-COR LAN 6034 trunk amplifiers. In the branch or distribution cables 22–24, there are corresponding distribution amplifiers, here C-COR LAN 101, indicated at 32. These amplifiers are positioned as required to maintain signal strength throughout the network 12.

The main trunk amplifiers amplify two broad band spectrums, namely a first inbound broad band spectrum 5–186 MHz, and a first outbound broad band spectrum 222–450 MHz. The amplifiers 32 have similar characteristics. Thus, each of the amplifiers 30, 32 will amplify the lower or first broad band spectrum 5–186 MHz for inbound signals travelling to the head end unit 2, whilst amplifying signals in the outbound broad band spectrum 222–450 MHz which are travelling from the head end unit 2.

For satisfactory amplification, and to avoid saturation and intermodulation, amplification levels cannot be too great. Thus each signal must be within a certain range, typically 10–30 dB, so that weak signals do not become lost in noise and strong signals do not saturate and do not cause interference or intermodulation with other signals.

The cable status monitoring computer 6 is provided with a C-COR Quick Alert status monitoring system. This is a software package running on an IBM PS/2 which allows the operator to set fault and alarm windows, maintenance report printing, operator controlled security levels and switch controls for AFA, bridger and A/B switches. SMT (Status Monitoring Transponders) transponders will provide the interface from the broad band network to the quick alert status monitor system. A master modem 7 located in the head end unit 2 provides the interface between the PC 6 and the cable network 12 and a similar modem 5 is provided for the PC4.

Transponders (not shown) in the trunk cable 14 monitor RF signal level, DC voltage, rectified AC line voltage, transponder temperature, another housing lid closure, and bridger switch status. The transponder activates an AFA (Automatic Failsafe Amplification) test or switches the trunk to an automatic fail safe amplifier. Should a problem on a branch cable 22, 23 or 24 be causing trunk problems, the bridger amplifier can be shut off remotely, to isolate that branch.

As indicated in FIG. 10, the T11-K broad band channel pair are used for communication between the PC 6 and amplifiers 30, 32. Since the controller or PC 6 is connected via modem 7 at the head end unit 2, no frequency translator for the T11-K broad band channel pair is needed. The main power supply for the communication system 1 will be from a conventional 110 VAC power. Two uninterruptable power supplies, here Alpha Technologies UP960 will be provided, which are capable of providing 2–4 hours of 60 VAC to the active components of the systems. One further uninterruptable power supply, here a UP750 RM from Alpha Technologies will provide 120 volts AC to the head end unit 2, similarly to the other uninterruptable power supplies. These power supplies use three 12 volt nominal gel type batteries. One of the UP's 960 power supplies will be located at the head end unit 2, whilst the other one would be located at the lowest level associated with branch cables 24.

The head end unit 2 is a connection, monitoring and powering unit for the broad band system. Frequency translators in the head end unit 2, translate the low frequency inbound signals received by the head end unit, in the first broad band spectrum of 5–186 MHz to outbound high frequency signals in the second broad band spectrum of 222–450 MHz. This is achieved using 192.25 MHz translators for the allocated channels, as indicated at 78–81 in FIG. 1.

It is to be appreciated that some channels allocated do not require frequency translators at the head end unit 2. Devices on the broad band cable network 12 which communicate only with other devices that are located only at the head end unit 2 do not need to have their signals rebroadcast on the outgoing channels. With reference to FIG. 10 and table 1 below, the selected channel allocations for this preferred embodiment will be detailed. The channel allocations are:

2'-O for PCNET channel (detailed below);
E-GG for mobile mining vehicle radio data logging and control;
F-HH for mobile mining vehicle video;
T11-K various services.

The T11-K channel pair is used for several services as follows:

Cable status monitoring (31 and 223.25 Mhz);
LANCC control channel (32 and 224.25 Mhz);
Telephone modem channels (33 and 225.25 Mhz. +100 Khz for each channel, etc.).
SCADA modbus modem channel (35 and 227.25 Mhz).

For the T11-K channel pair, the services involve devices located only at the head end unit, so no frequency translation is necessary at the head end.

The following Table 1 details the characteristics of individual signals, both on the broad band system 12, and as wide band radio signals transmitted from and received by the distributed antenna units 101.

TABLE 1

| Service | Signal in Broad Band | Signal in Air |
|---|---|---|
| RS232 data | FSK Narrowband full duplex TX 33 MHz/RX 225.25 MHz B/W: 50 KHz | CDMA Spread-spectrum Packet TX/RX 902–918 Mhz B/W: 16 Mhz |
| Mobile data Acquisition | FSK 2 Mbps B/B LAN CH:2'-0 B/W: 6 Mhz | FSK Narrowband simplex 459.2 Mhz B/W: 50 KHz |
| Personnel Voice (1st type) | 32 Kbps CVSD Dig. audio TX 35 MHz/ RX 227.25 B/W: 100 KHz per channel | FM Narrowband analog audi MHz403–433 MHz B/W: 25 KHz |
| Personnel Voice (2nd type) | 64 Kbps PCM Dig. audio TX/RX: 30–450 MHz B/W: 2 MHz in T1 frame (24 PCM channels/carrier) | FM Narrowband analog audio 403–433 MHz B/W: 25 KHz |
| Mobile Video | NTSC Std CH F-HH B/W: 6 MHz | Dual carrier NTSC freq. diverse CH 11 & 13 B/W: 12 MHz |
| Mobile | FSK Narrowband | FSK Narrowband |

TABLE 1-continued

| Service | Signal in Broad Band | Signal in Air |
|---|---|---|
| Ctrl | CH E-GG B/W: 50 KHz | 469.75 MHz B/W: 50 KHz |
| FM Entertainment | FM Wideband CH YY B/W: 6 MHz | FM Wideband 89–94 MHz B/W: 5 MHz |

FSK = Frequency Shift Keying
PCM = Pulse Code Modulated
CDMA = Code Division Multiple Access
CVSD = Continuously Variable Slope Delta The T11-K channel pair can be used for a variety of services. As indicated in Table 1, this can include an RS232 data channel. The exact allocation can be varied. Thus, the frequency pair 35 Mhz/227.25 Mhz and successive pairs at 100 Khz higher can be assigned to a series of telephone channels.

The channel YY is used as an entertainment/information/emergency channel. This can include multiple entertainment channels which can be received by standard FM broadcast-band receivers. At the system head-end, multiple audio sources from off-air receivers, tape players, etc. are modulated onto carriers in the outbound band spectrum and distributed to distributed antenna units throughout a mine. These signals are then translated into a portion of the standard FM broadcast band (89–94 Mhz) and amplified before being combined in the frequency band-splitter in the distributed antenna unit for transmission over the radiating antenna segments covered by that unit.

Additionally, at the system head-end, a microphone or other audio source can be substituted for the normal entertainment audio in order to provide emergency or information messages on all or selected channels of the entertainment system. A switch in the audio paths of entertainment channels provides this selectable function.

Fixed Voice Telephone

Referring to FIG. 2a, this shows an overall schematic of the broad band fixed telephone network. Here, the broad band trunk cable network is indicated at 12. A conventional Bell Centrex phone switch is shown at 40. The Centrex switch 40 is connected to the conventional telephone system, indicated schematically at 42. Conventional telephone lines are indicated at 44, e.g. telephones located in offices, buildings at the surface of the mine. The head end unit 2 is connected via modems 46 to the Centrex phone switch 40. Here, two modems 46 are shown for channels A, B, but it will be appreciated that as many channels as desired can be provided.

Correspondingly, there are two transportable telephones 48, each adapted to both receive and transmit on a single channel, one being adapted for channel A and the other for channel B. These two telephones 48 are connected via modems 50 to the broad band cable network 12.

The configuration is such that the telephones 48 can be used for direct extension dialling to phones within the Centrex system 40, e.g. the telephones 44. Additionally, they can be used to obtain access to outside Bell telephone lines. By use of the modems 50, the telephones 48 can be connected to any broad band tap on the network 12. As the Centrex system is connected directly via a modem to the head end unit 2, there is no need for any translator for the T11-K channel pair at the head end unit 2.

FIG. 2b shows graphically and schematically the transmit and receive signals paths between the Centrex 40 and telephones 48, with the various components being given the same reference numerals in FIG. 2b.

Thus, as indicated by the arrow 52, a signal from the telephone 48 is transmitted onto the T11 channel, and hence to the Centrex switch 40, as indicated by arrow 54. For a signal travelling in the opposite direction, this is sent by the Centrex 40 on the K channel, as indicated by arrow 56, and then, as shown by arrow 58, the signal is transmitted through to the telephone 48. Voice Radio Referring to FIG. 9, this shows the signal paths of the current invention for voice radio communication. A signal from a radio, for example the radio or hand held 73 (FIG. 3), would be in the frequency band 416–420 MHz. A proximate distributed antenna unit 100 would receive this transmission and repeat it on an offset channel frequency in the 406–410 MHz band using a repeater 128. This function provides local radio coverage in the area assigned to a particular distributed antenna unit. For communications outside of this area, a telephone interface 126 is accessed by the radio telephone user and connects over the broad band cable system 12 using a pair of point to point modems, 124 and 46. The modem 46 at the head end of the broad band network connects to normal telephone lines (Centrex lines). Connection between users on different distributed antenna units, or between a radio telephone user and a normal telephone user are effected through the conventional PSTN or Centrex system.

Mobile Voice Radio

In the above implementation, voice communication is supported in a manner similar to surface radio voice repeaters with phone patches. (This is indicated in Table 1 as 1st Type, with TX 35 Mhz and RX 227.25 Mhz with a band width of 100 Khz per channel). Whilst this functions well in many respects, it has a number of drawbacks: there are different protocols for talking to someone on the same level, as compared to someone on a different level or on a conventional telephone; it provides poor privacy of conversation, and requires manual verification that a channel is not busy; this makes it easy to accidentally interrupt another conversation. There is poor notification of an incoming call, especially where the caller is coming from a phone patch and is not radio-aware. Such systems require relatively expensive, scanning hand-held units, to enable calls to be received from multiple repeaters. Each new voice repeater requires a voice modem pair, and a new port on the antenna combiner voice receive and transmit paths. Each voice channel takes a broad band port at the head end and a port at the other end of the cable network.

As an alternate means of implementing voice radio communication, the following preferred implementation requires additional, non-conventional equipment, and offers solutions to many of the problems discussed above.

In such an augmented system shown in FIG. 3, the cable network 12 is also connected to a radio controller 72, capable of controlling N radio conversations, where N is selected for each individual system. Two portable radios are shown at 73, these radios operating on channels A and B respectively. Distributed antennas 101 are connected by distributed antenna units 100 to the cable network 12. For simplicity only two such units 100 are shown.

To avoid interference and other problems associated with conventional voice radio systems, and further to simplify the design of the radios themselves, each radio has a single assigned channel. (As indicated as 2nd Type in Table 1, this would be implemented by pairs of carrier, each of 2 Mhz in the 30–450 Mhz spectrum. Each carrier includes 24 PCM channels. This is implemented using frequency agile modems.) At the start of a shift, each individual who requires a radio or radio telephone, would select one of the radios, e.g. the radio 73, from a pool or store of such radios 73. That individual's unique telephone number or extension would then be assigned to the corresponding radio for the duration of that shift by the radio controller 72. This assignment would be recorded in the radio controller, so that the radio controller 72 would have a correlation for each individuals' telephone number irrespective of the radio and radio frequency and channel selected arbitrarily from the pool.

It is to be appreciated that the radio controller 72 acts as a supervisor and call router for the voice radio system. It determines call routing, and links to a distributed antenna unit voice communication link which carries all of the voice and control information for a single distributed antenna unit over a single broad band cable linked communication service.

The head end unit 2 contains the single voice radio controller 72 which acts as a supervisor and call router for the voice radio system. This master controller accepts a certain number of phone lines, the maximum of which is determined by the system design, determines call routing and links to a distributed antenna unit voice communication link. This link carries all of the voice and control information over a communication service on the broad band cable. Each distributed antenna unit 100 contains the mating broad band link to the master controller, voice CODEC functions and a number of repeaters, as desired. These repeaters are frequency agile and quickly scan up to 256 received frequencies to determine new communication requests. Each of the voice radio units or hand helds 73 operates on a single, dedicated channel pair with no requirement for any intelligence or multiple channel scanning, etc. Only a simple DTMF pad is required. The detail or manner of making incoming and outgoing calls will now be described, as experienced by the user of the system.

For incoming calls the initiator calls a single common number to gain access to one of the incoming phone lines to the radio controller through the Centrex 40. The initiator is informed by voice and/or by a second dial tone that he has reached the radio system and to enter the phone or telephone number of the user he wishes to contact. If the user is not logged into the system, a voice message is given to the caller that the user is not on the system currently. If successful, the controller 72 finds free repeaters on each distributed antenna unit 100 and sends a ring tone on that radio's frequency. As indicated at 76 in FIG. 3b, this is sent on channel K to the head end unit 2, which retransmits on channel T11, which is then demodulated as indicated at 77. The called party, on hearing the ring tone, effectively "picks up" his portable radio by keying "*". As indicated, the receive and transmit channels for the radio telephone 73 are offset. The signal from each radio telephone 73 is transmitted on channel T11, as indicated at 74, and then retransmitted on channel K by the head end unit 2, before being received by the controller 72 as indicated at 75. When the controller 72 determines which distributed antenna unit 100 received the "*", i.e. which unit 100 is making the connection, then it links the call, and frees any other repeaters for other use. The called party and the initiator can then talk to one another. When a call is finished, a "#" from either party breaks the line, freeing the repeater and phone line.

For an outgoing call, a holder of a radio or hand held, presses "*" to effectively "pick up" the phone. It may be necessary for this to be held for some time, for example 10 seconds, in order for a free repeater to scan the frequency associated with that radio and lock onto it. The master controller 72 then gives the user a dial tone and the user dials the number he wishes to reach.

Where the number is another radio, the master controller 72 finds this, as outlined above, and determines if it is logged into the system. If it is, it proceeds to try and locate the user and ring and link up to that other user as outlined above.

If the number dialled is not recognized as a radio phone number, the controller 72 accesses an outside line through the centrex 40, tone dials the number and links the line to the user's repeater and hence to the corresponding radio. The call proceeds and is terminated as above.

As mentioned above, at the start of a shift, or otherwise, a user will pick up a portable radio, and log it into the system. The user's number would then be recorded against the corresponding radio frequency in the controller 72. Only frequencies logged onto the system will be scanned, when the controller 72 instructs individual distributed antenna units 100 to check for activity. The individual distributed antenna units 100 will use as many repeaters as they have free to divide the scan time to cover the active frequency list. 10 seconds is the worst case scenario, where there is only one repeater available to scan and there are 256 logged-in users.

It can be noted that two repeaters are required for any radio to radio communication, whether or not the radios are on the same level. Full duplex communication is possible, but most hand held radios do not support this facility.

Further facilities can be provided, where the radios 73 etc. can scan between their unique frequency and a standard receive-only broadcast frequency. Then, group, all call and emergency signalling are possible. This can be used for broadcasting messages to all personnel within the mine, for sending instructions in case of an emergency, e.g. fire, flooding, etc. Without this facility, the radio controller 72 could still be programmed to signal a unique tone or voice message to logged-in users, as quickly as is possible, by sequentially activating each logged-in frequency and transmitting the message.

Inactivity on a radio telephone link would cause release of the link after a programmable amount of time. The radio controller 72 can be used to collect statistics on use of the system.

The distributed antenna units 100 are optimized for fast scanning for "*" call initiation. Further, they include extra amplification for receiving a signal and providing integral 16-way split through a splitter 132 for multiple receivers in the DAT. There is integral transmit signal combination for up to 16 transmitter signals into a single linear broad-band amplifier to drive the distributed antenna network. Unlike conventional radio communication systems, all calls are private. As the hand held radios 73, etc. only receive on their own frequency, there is no way or possibility for another user of the system to know that another call is taking place, or to listen to such a call. Incoming calls are well announced by a ringing tone, and the receiving unit is not immediately dumped or connected onto the telephone line. It is necessary for the telephone to be "picked up" by pressing the "*" button.

A further consequence of the individual allotted frequencies is that there is no possibility of one user accidentally stepping on or interrupting another conversation. If all repeaters are busy, no dial tone is received. If all master controller 72 trunk lines are busy, then a busy signal is received.

The choice of which preferred implementation to choose in a given installation is determined by the relative costs for fixed and portable elements of the system, by the perceived difficulty of use of the system, by the number of distributed antenna units required, and by the number of users, ie. portables, which are to use the system.

Locator/Emergency Beacon

An adjunct to the intelligent controller and scanning repeater architecture can be implemented, possibly on a different band, for location of personnel or equipment. Thus, each person or piece of moveable equipment could be provided with a small radio beacon which could be small, inexpensive and robust. Such a beacon could be attached to a miner's helmet and draw power from the helmet lamp power supply. Such a unit could be of the size of 1 cubic inch. It could transmit a pulsed carrier to reduce power demand. Again, various techniques could be used for identifying each individual person, e.g. by a unique pulse code or frequency. It could further be determined which distributed antenna unit is picking up the signal from each user's beacon. This enables the approximate location of personnel throughout a mine to be determined.

It is also possible for each user to be provided with some sort of emergency button so that if they were injured or got into a dangerous situation, e.g. if they became trapped by falling rock, etc., they could activate the emergency button which would immediately send a signal to the head end unit 2, so that supervising personnel could take the necessary action. Alternatively, to cover a situation where a miner is knocked unconscious, a helmet mounted unit could automatically transmit a signal if it fails to sense any movement within a predetermined time.

Video Monitoring System

The fixed video monitoring system is shown schematically in FIG. 4a and is based on a C-COR's LANCC camera control monitoring system. This controls ten environmentally protected cameras, these being RCA cameras. The cameras are standard light units with proper illumination being supplied. The cameras are shown schematically at 60 in FIG. 4a, and each camera 60 includes a respective camera pod 62, for controlling pan, tilt, zoom and focus of the respective camera. Each pod 62 monitors its own operating parameters such as DC voltage and lid closure. C-COR's Quick View software is run on the PC 4, which is an IBM PS/2, to control the functions of the camera pods 62 and display the status of the pod ports. These ports can be configured to accept contact closure from devices on equipment such as conveyors, so as to notify the operator of any abnormal conditions by means of a pop-up window at the operators work station. As shown in FIGS. 1 and 4a, the PC 4 is connected via a master modem 5 to the head end unit 2. The master modem is a C-COR 8941. Communications take place on the portion of the T11-K broad band channel pair. As the PC 4 is connected via the master modem 5 to the head end unit 2, no translation of this T11-K broad band channel pair is needed.

Radiating Cable Spectrum

The spectrum for the distributed antennas is divided into three parts, namely dedicated inbound part, dedicated outbound part and a special purpose part. The dedicated inbound and outbound parts or regions are for ease of support for wide band signals. This band split provides a number of advantages. The distributed antenna units 100 can support multiple services with a single frequency band splitter, and extra lengths of radiating cable for the distributed antennas 101 maybe supported for these services by the use of inbound and outbound reamplification.

The division between the broad band distribution system or network 12 and the distributed antennas 101 enables quite different standards to be maintained in these two parts of the communication system. Thus, in the broad band distribution system, relatively uniform signal levels are maintained.

For the distributed antenna units signals are separated and processed separately. In general, there is no need for amplication along the leaky coax cables, and the present system avoids this; where this is required the overall distance will still be relatively short, so the problem of repeated amplification of a broad band signal does not arise.

Note that unlike the non-radiating broad band cable system, there are no band-limited amplifiers to restrict frequency use to solely in- or outbound, and as such, frequencies within the three defined areas can in fact be used for any in- or outbound or bi-directional use. As each signal is processed independently within each distributed antenna unit, it can accept a variety of signals of varying frequency and modulation. More particularly, the unit 100 can accept or receive from the antenna 101 a wide variety of amplitude levels. The unit 100 processes each signal, e.g. by varying its frequency or modulation as desired, so there need be no one to one correspondence between the radiating cable spectrum of the antennas 101 and the spectrum of distribution system 12. The unit 100 also ensures that any signal transmitted onto the main distribution system 12 has an amplitude within an acceptable range, to avoid transmission difficulties along the distribution system 12.

The special purpose region of the spectrum is intended to support existing radio based equipment which may not easily be replaced by "standard" radio LAN style boxes. The current radio control and data acquisition functions may be easily replaced with radio links in the dedicated in and outbound regions of the broad band spectrum. The special purpose region of the spectrum is used for voice communication, as there is currently a large variety of hand type held portable voice radios available. Thus, by choosing a spectrum so that the in and outbound parts of the spectrum overlap an existing voice radio region, the required functions can be accomplished in a single frequency split.

The split is as follows:
3–413 MHz inbound spectrum
413–423 MHz guard band
423–850 MHz outbound spectrum This split allows the use of low UHF band hand held voice radios, operating in the range 403–433 MHz. This allows for a 10 MHz receive region and a 10 MHz transmission region with a 20 MHz RX/TX split. This also permits the re-transmission of the existing radio control signals (468.70–.85 MHz). The video inbound signal already exists on a channel in the inbound spectrum. The only service not directly supported in this model is the current data acquisition service. This half-duplex, single frequency style of radio communication is not suited, either to this radiating spectrum model, or to the broad band cable network 12, and accordingly is replaced with a radio LAN model with separate in- and out-bound channels.

It can be noted that the "special purpose" regions have been integrated into the proposed upper and lower broad band spectrums, leaving a flat spectrum model, at the expense of a narrower guard band. It is possible for transmission to occur on an inbound channel, or reception from an outbound channel as discussed above.

Fixed Video

The television and another PC, an IBM PS/2, running the Quick View system would be located in an office where the modbus system is located.

The camera pod 62 include modems that are frequency agile allowing a selection of various TV channels to be used. Broad band channel 5' has been chosen for the video monitoring system, as shown in FIG. 10. The television receiver 10 would be tuned to channel 5'. As the television 10 is only required to receive a signal, there is no need for frequency translation to the complementary channel, namely channel S.

FIG. 4b shows the communication scheme for the video monitoring system. For transmission from a camera 60, this is on channel 5' to the cable network 12, as indicated by arrow 64. In turn, as indicated by arrow 66, this signal is transmitted to the television receiver 10 on channel 5'.

Figure 5A:
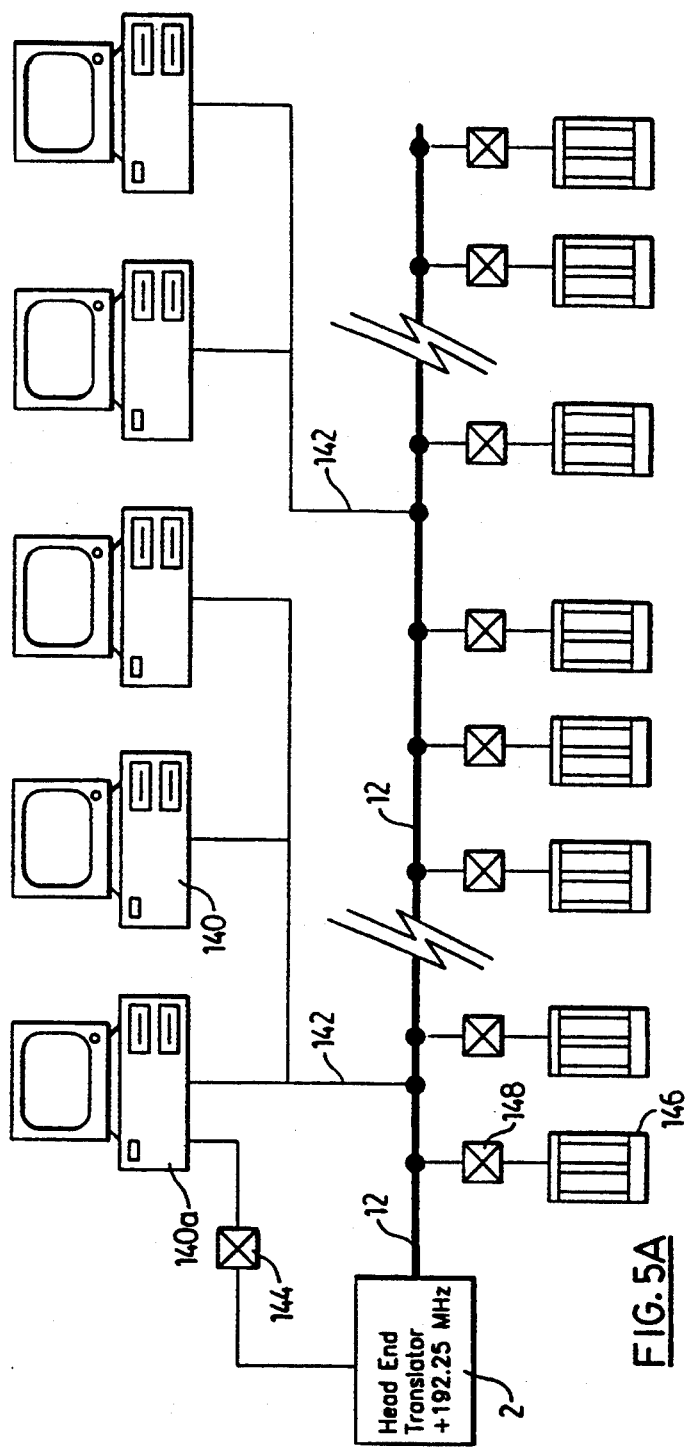
FIG. 5a is a schematic view of a network for fixed control and data acquisition incorporated into the transmission system of the present invention.

For control signals, these are sent on the T11-K channel pair. Arrow 68 indicates a control signal being sent from the PC 4 on channel K via the main broad band cable network 12, which in turn is received by the camera and pod 60/62. A signal from a particular pod/camera 60/62 combination is sent, as indicated by arrows 70 over channel pair T11-K. This signal again is sent via the network 12 to the PC 4. As mentioned above, the Supervisory Control and Data Acquisition (SCADA), system is based on a DMACS software package. This is shown on FIGS. 5a and 5b.

Data Acquisition System

Referring to FIG. 5, this shows the Supervisory Control and Data Acquisition (SCADA) aspect of the system. As mentioned above this SCADA system is based on DMACS. It is fully configurable and could be extended through customized I/O drivers or programs written in C Language. DMACS provides a networked solution to Supervisory Control and Data Acquisition requirements. In FIG. 5, a number of personal computers 140, here IBM PS/2, are connected to nodes on an industrial LAN 142; connected to the broad band cable network 12. Two such LANs 142 are shown, although the number could vary. One PS/2 indicated at 140a has an ARTIC card, to enable it to communicate using the MODBUS protocol via a point to point modem 144 with the head end unit 2. No translation is needed for the T11-K channel pair.

A variety of controllable Programable Logic Controllers (PLC) are indicated at 146 and are connected to the broad band cable network 12. Each PLC 146 is connected by a respective point to point modem 148, and again uses the MODBUS protocol.

Figure 5B:
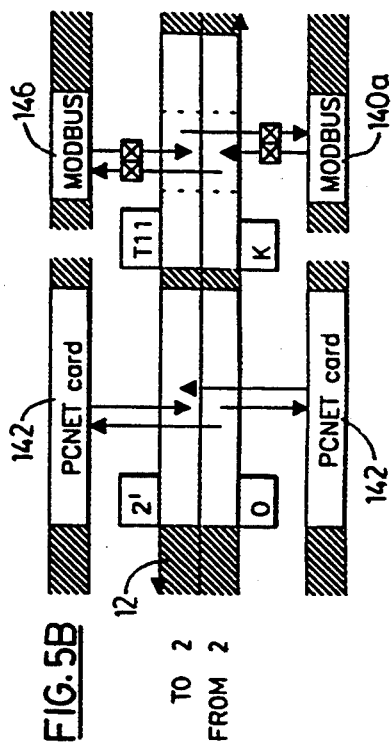

As FIG. 5B shows, a PCNET card of a LAN 142 transmits on channel 2′, and receives on channel 0.

The ARTIC Card on the PC 140a transmits to the head end 2 on channel K through modem 144, and receives on channel T-11. The PLCs 146 receive on channel K and transmit on channel T11 via respective modems 148.

Mobile Video, Control, Data acquisition

Figure 7:
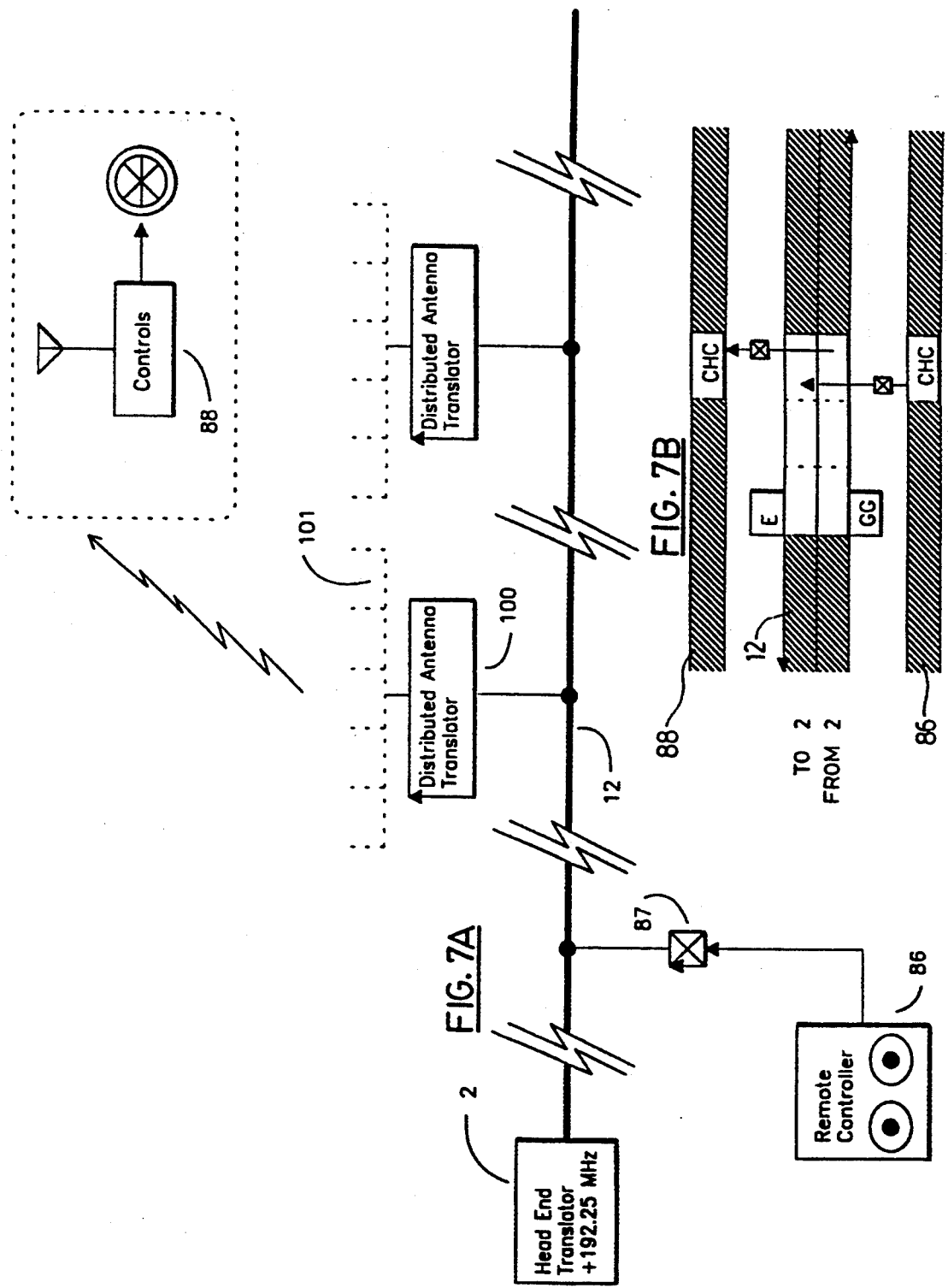
Figure 8:
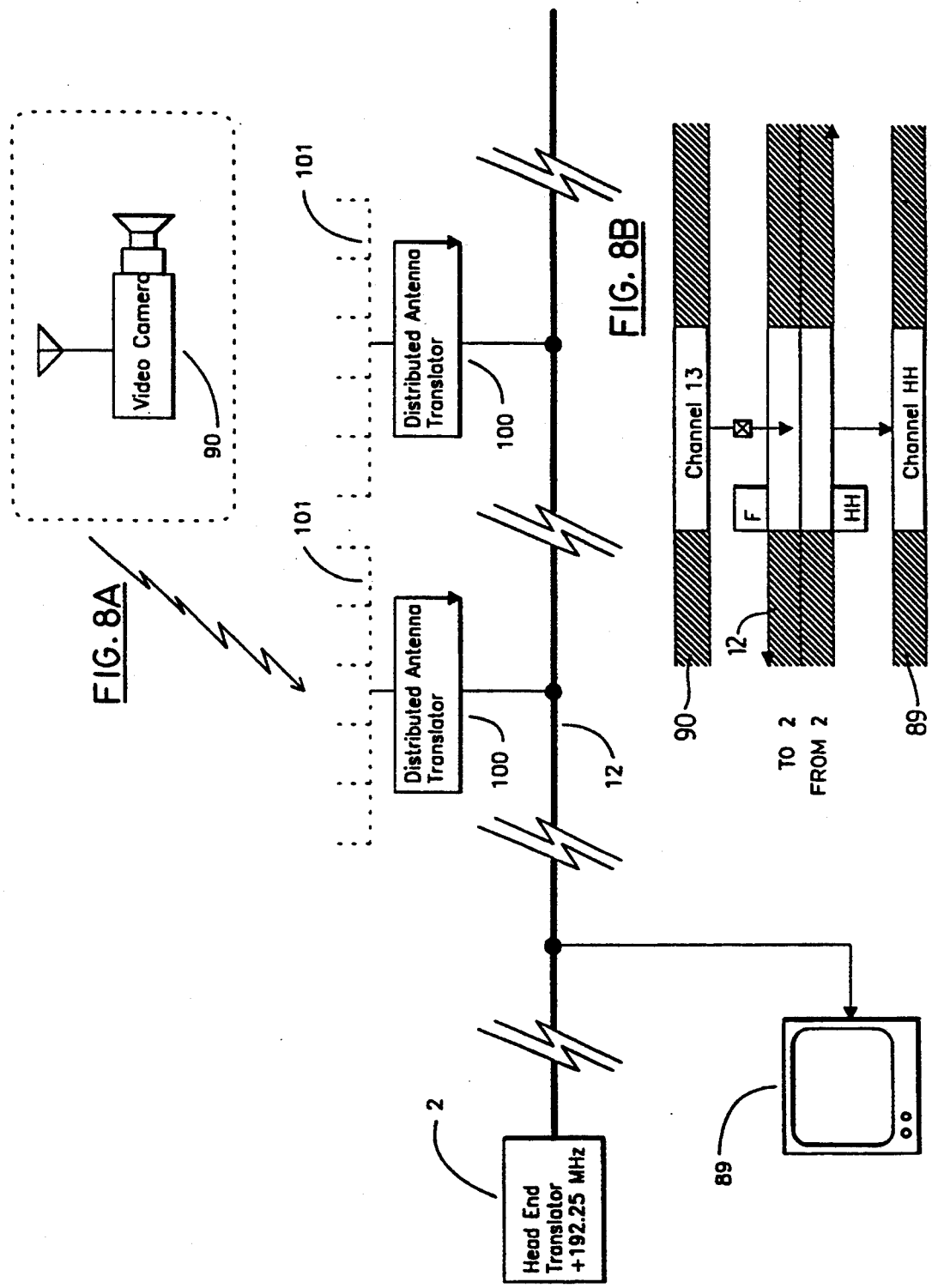

Reference will now be made to FIGS. 6, 7 and 8, which show details of the arrangement for collecting data and providing control and video communication with a mobile mining vehicle. This preferred embodiment provides these facilities for a mobile mining vehicle, such as a Scooptram (Scooptram is a registered trade mark of Wagner Inc.). Such a mining vehicle could be a Load-Haul-Dump (LHD) vehicle. However, it will be appreciated that the basic principles described could be applied to a variety of other mine equipment, either fixed or mobile. For example, similar facilities could be provided for a drilling system within a mine. Again, in FIGS. 6, 7 and 8, like components are given the same reference numeral as in other figures.

It is here noted that it is known for mobile mining vehicles to be provided with various radio controls and data logging devices. In current mine environments, mobile mining vehicles are frequently sent into areas which are not accessible to mine personnel, due to their instability and danger of rock falls, etc. For this reason, mobile mining vehicles are currently provided with a remote radio control facility. This however relies on the operator having an open line of sight to the mobile mining vehicle, so that the operator can simply visually monitor the mobile mining vehicle's activities. It is also known for a mobile mining vehicle to be provided with a data logger for recording various data, which data is then transmitted by radio to a fixed data logging computer system, usually located in the mobile mining vehicle garage, when the mobile mining vehicle is close enough for direct radio communication.

Mobile Data acquisition

Referring to FIGS. 6 and 9, this shows the broad band cable network 12, with a broad band PC-LAN modem 82 connected to the stationary data monitoring computer 84. This modem communicates with the equivalent PC-LAN modem 116 in the DAT unit 100 and in turn with an rf controller computer in the DAT. This controller communicates with the mobile mining vehicle through the distributed antenna network, on channel D (459.2 MHz).

The mobile mining vehicle itself is provided with a data collector 85, as shown schematically, which both receives and transmits on channel D.

Thus, this arrangement makes use of an existing mobile mining vehicle data collector and radio data logger that operates on channel D. It interposes communication over a broad band PC-LAN link. It will be appreciated that there is no necessity for the use of channel D, and it is possible for the data collector and radio data logger to operate on different channels.

Mobile Control

Similarly, with reference to FIG. 7, an existing mobile mining vehicle control arrangement is effected over channel C, and this is incorporated in the mobile mining vehicle controls. These again are effectively converted to the channel pair E-GG for communication with the head end unit 2, but again this is not a necessity. It is possible for the mobile mining vehicle control and remote controller to operate on different channels which could be compatible or otherwise equivalent to the channels used for communication with the head end unit 2.

A mobile control vehicle remote controller is shown at 86 and is connected via a frequency translator 87 to the broad band cable network 12. The translator 87 receives an input on channel C and produces an output on channel E.

As before, the channel E transmission is received by the head end unit 2, which translates it and retransmits it on channel GG.

The channel GG transmission is received by the distributed antenna units 100, which translates or reconverts it, and then transmits it through the distributed antennas 101 on channel C.

Each mobile mining vehicle includes a mobile mining vehicle control unit 88 for controlling the mobile mining vehicle. The control signals would include appropriate identifying information, so that only the respective mobile mining vehicle would be activated.

Mobile Video

Turning to FIG. 8, this shows the corresponding arrangement for mobile mining vehicle video reception, which generally corresponds to FIG. 7, with the principal difference that the signals are being received from the mobile mining vehicle rather than transmitted to the mobile mining vehicle. Also, as compared to mobile mining vehicle control and data logging, the channel pair F-HH is used on the broad band cable network 12.

Here, a television receiver 89 is connected to the broad band cable network 12. Correspondingly, each mobile mining vehicle is provided with a video camera 90, which transmits on channel 13. As indicated in FIG. 8b, this channel 13 communication is communicated through the respective and adjacent distributed antenna unit 100 onto the broad band cable network 12, with frequency translation to channel F. This is received by the head end unit 2, which converts the signal onto the channel HH of the channel pair F-HH. The television receiver 89 is tuned to channel HH, and hence receives the signal without the necessity of any further frequency translation or the like.

It will be appreciated that the channels and frequencies selected, while chosen to provide good performance, are not unique.

Distributed Antenna Unit

Referring now to FIG. 9, this shows the head end unit 2 and the broad band cable network 12 schematically, and a distributed antenna unit 100 in greater detail.

The modems 46 for the Centrex telephone lines are shown connected to the head end unit 2. Additionally, a frequency translator 98 is provided for translating the two channel pairs GG-E and HH-F for mobile mining vehicle datalogging and video, detailed above.

The distributed antenna unit 100 includes a frequency band splitter 102, which has a port 104 connected to ports 106 for radiating coax segments.

It should be noted that, in view of the schematic nature of FIG. 9 and for ease of understanding, the connections to the broad band distribution system 12 are shown schematically. In practice, there would be just one connection between each unit 100 and the distribution system 12.

A first video line 108 includes a video frequency translator 110, which converts a signal in the band 210-216 MHz, i.e. channel 13, to channel F having a frequency band of 150–156 Mhz. This signal is then output to the broad band cable network 12.

A second data acquisition line 112 is arranged for both transmission and reception and includes a data acquisition radio frequency controller 114 and a modem 116. The controller 114 communicates with the band splitter 102 at a frequency of 459.2 Mhz.

A third control line 118 includes a frequency translation unit 120 for converting a received signal on channel GG to a frequency of 467.75/467.80 Mhz. A 5 watt amplifier 122 is provided for amplifying this signal.

Whenever more than one service is provided over an antenna segment, the band splitter 102 is provided for combining and splitting the various frequency bands for each service. This band splitter 102 provides for acceptable path losses for each of the services, as well as providing a high degree of isolation between the signal processing means for each service. It is essential that the band splitter 102 does not allow high signal levels from a particular transmitting device to appear either at other transmitters or other receivers. In the first case, high intermodulation can occur between transmitters, and in the second case, desensitization of the receiver input can occur. For services with wide bandwidths, it is desirable to keep the path loss to an absolute minimum in order that good signal to noise performance can be maintained. Hence, the band splitter 102 is configured to provide shorter or lower loss paths for the wider band width signals.

The band splitter 102 provides for 75 ohm impedance for the video line 108 and the control line 118, whilst providing a 50 ohm impedance for the data acquisition line 112.

The distributed antenna unit 100 also includes a number of lines for voice or telephone communication. Each line includes a modem 124 connected by a twisted pair to a telephone I/F (interface) unit 126. This in turn is connected through to a repeater 128.

The repeaters 128 have transmit outputs connected to a combiner 130 and receive inputs connected to a splitter 132. The splitter 130 and combiner 132 are connected to respective ports 131 and 133 of the frequency band splitter 102, each of these ports providing for a standard 50 ohm impedance. The frequencies received and transmitted by the repeaters 128 are in the bands 416–420 MHz and 406–410 MHz respectively.

The ports 106 are connected to individual lengths of leaky coax cable forming a distributed broad band antenna 101. These leaky coax segments would be of a length and arrangement as required to give coverage in the vicinity around the distributed antenna unit 100, i.e. to give coverage in an area having a topology corresponding to the configuration of the coax segments.

Thus, each distributed antenna unit 101 includes separate signal processing devices for each signal. Each signal processing device effects necessary translation and conversion between the broad band, non-radiating system 12 and the leaky coax cables 106. The signal processing devices function unidirectionally or bidirectionally as required to effect necessary translation in frequency, e.g. as at 110, and in modulation, e.g. as at 124.

Further, all devices putting a signal onto the broad band distribution system 12 do so at a level that is compatible with the levels in the system 12.

We claim:

1. A communication system comprising: a non-radiating broad band distribution system having a plurality of connection points for transmission in a first outbound broad band spectrum and reception in a first inbound broad band spectrum, which are sufficiently spaced from one another to permit separate amplification thereof; a plurality of wide band antenna means, for transmitting and receiving a plurality of signals in a second outbound wide band spectrum and a second inbound wide band spectrum, each wide band antenna means comprising an elongate distributed antenna providing communication within an area having a configuration corresponding to the topology covered by the distributed antenna; means for maintaining signal levels in the broad band distribution system between desired limits; and a plurality of distributed antenna units, each connected between a respective connection point of the broad band distribution system and a respective wide band antenna means for bidirectional processing of signals therebetween;

wherein each distributed antenna unit comprises: a main connection port connected to a respective connection point of the broad band distribution system; an antenna port connected to a respective wide band antenna means; a plurality of signal processing devices, for bidirectional processing of signals between the main connection and antenna ports and connected to the main connection port, each signal processing device being able to receive signals from and transmit signals to the main connection port in a first outbound frequency band and a first inbound frequency band respectively, and to receive signals from and transmit signals to the antenna port in at least one second inbound frequency band and at least one second outbound frequency band respectively, with each signal processing device being able to effect required translation in frequency, amplitude and modulation between the first and second inbound frequency bands and between the first and second outbound frequency bands, and with each signal processing device ensuring that each signal transmitted to the main connection port in the respective first inbound frequency band is at a desired level compatible with the broad band distribution system, and with the first inbound frequency bands all being in the first inbound frequency spectrum and the first outbound frequency bands all being in the first outbound frequency spectrum; and a frequency band splitter and combiner means connected between the signal processing means and the antenna port, the band splitter and combiner means being capable of combining signals in different frequency bands being transmitted to the antenna port and being capable of splitting frequencies received from the antenna port for separate processing by the signal processing means.

2. A system as claimed in claim 1, wherein the band splitter and combiner means separates different frequency bands for selective connection to respective signal processing means.

3. A system as claimed in claim 2 and further comprising: a head end unit, for transmitting signals in the first outbound broad band spectrum, and receiving signals in the first inbound broad band spectrum, and connected to the broad band distribution system, wherein the means for maintaining signal levels comprises a plurality of amplifier means located in the broad band distribution system at a plurality of corresponding locations, each amplifier means being capable of amplifying the first inbound broad band spectrum in one direction and amplifying the first outbound broad band spectrum in the other direction, whereby a plurality of first inbound frequency bands may be transmitted in one direction along the distribution system and a plurality of first outbound frequency bands maybe transmitted in the other direction along the distribution system.

4. A system as claimed in claim 1, 2 or 3, wherein each distributed antenna comprises a plurality of leaky coax segments.

5. A system as claimed in claim 3, which includes a plurality of telephones connected to the broad band distribution system, either directly or indirectly through a signal processing means.

6. A system as claimed in claim 5, wherein each telephone is connected to the broad band system via a respective modem.

7. A system as claimed in claim 6, wherein at least one of the telephones connected to the broad band system is portable, wherein the broad band system includes, at selected connection points, a plurality of taps to which the telephone can be connected.

8. A system as claimed in claim 3, which includes a plurality of radio telephones which transmit to and receive signals from the wide band antenna means, and wherein a central radio controller unit controls switching between the individual radio telephones.

9. A system as claimed in claim 8, wherein a respective inbound telephone channel in the first inbound broad band spectrum is assigned for communication from the radio telephones to the head end unit and an outbound telephone channel in the first outbound broad band spectrum is assigned for communication from the head end unit to the radio telephones, with a unique frequency in each of the outbound and inbound telephone channels being assigned to each radio telephone for reception and transmission, and wherein the central radio controller unit is connected to the broad band distribution system, controls communication between the radio telephones and effects frequency translation between selected ones of the radio telephones.

10. A system as claimed in claim 9, wherein the transmission of voice information from one or more telephones and or one or more radio telephones is effected by means of a single data link between the central controller and a signal processing means.

11. A system as claimed in claim 10, wherein the central controller is capable of assigning a selected telephone number to each radio telephone, whereby each user may have a selected telephone number assigned to a radio telephone held by that user, irrespective of which radio telephone is taken by that user.

12. A system as claimed in claim 11, wherein the broad band distribution system includes at selected connection points a plurality of taps, and wherein the system further includes a plurality of portable telephones and a plurality of corresponding modems, with each portable telephone being connectable to any tap by a respective modem.

13. A system as claimed in claim 8, 9, 10, 11 or 12, which further includes at least one modem for providing a connection between the head end unit and a conventional telephone exchange.

14. A system as claimed in claim 3, which includes at least one data acquisition device connected to a connection point of the broad band distribution system, and a data logging computer connected to a connection point of the broad band distribution system for communication with one or more data acquisition devices.

15. A system as claimed in claim 3, which includes a plurality of data acquisition devices connected to respective connection points of the broad band distribution system, at least one of which is a mobile device and communicates with an adjacent distributed antenna unit via radio, and which includes a data logging computer connected to a respective connection point of the broad band distribution system, and wherein the communication between the data acquisition devices and the data logging computer is effected via the distributed antenna units and the broad band distribution system.

16. A system as claimed in claim 14 or 15, wherein data transmission is effected by a pair of first inbound and outbound data channels in the first inbound and outbound broad band spectrums respectively, with the data acquisition devices and the data logging computer transmitting to the head end unit on at least one frequency in the first inbound data channel, and receiving communications from the head end unit on at least one frequency in the first outbound data channel 17. A system as claimed in claim 3, which includes a remote controller connected to one connection point of the broad band distribution system and a controllable unit for controlling a device, wherein the controller communicates with the head end unit on one control frequency in the first inbound broad band spectrum, and the head end unit communicates with the controllable unit on another control frequency in the first outbound broad band spectrum.

18. A system as claimed in claim 17, wherein the controllable unit is mounted on a mobile device, and communicates by radio with an adjacent distributed antenna unit.

19. A system as claimed in claim 3, which includes a plurality of video cameras connected to the broad band distribution system, and a video surveillance control unit connected to the head end unit, the video surveillance control unit including a television monitor and being capable of controlling the individual video cameras.

20. A system as claimed in claim 3, which includes a cable status monitoring computer connected to the head end unit, for monitoring the status of the broad band distribution system and the amplifier means therein.

21. A system as claimed in claim 20, wherein the amplifier means comprises, at each location, a main amplifier and at least one back up amplifier, and wherein the cable status monitoring computer is capable of switching in a respective back up amplifier, when failure of a main amplifier is detected.

22. A distributed antenna unit comprising: a main connection port for connection to a non-radiating broad band distribution system for reception in a first outbound broad band spectrum and transmission in a first inbound broad band spectrum, which are sufficiently spaced from one another to permit separate amplification thereof; an antenna port; a plurality of signal processing devices, for bidirectional processing of signals between the main connection and antenna ports and connected to the main connection port, each signal processing device being able to receive signals from and transmit signals to the main connection port in a first outbound frequency band and first inbound frequency band respectively, and to receive signals from and transmit signals to the antenna port in at least second inbound frequency band and at least one second outbound frequency band respectively, with each signal processing device being able to effect required translation in frequency, amplitude and modulation between the first and second inbound frequency bands and between the first and second outbound frequency bands, and with each signal processing device ensuring that each signal transmitted to the main connection port in the respective first inbound frequency band is at a desired level compatible with a broad band distribution system, and with the first inbound frequency bands all being in the first inbound frequency spectrum and the first outbound frequency bands all being in the first outbound frequency spectrum; and a frequency band splitter connected between the antenna port and the signal processing devices, the frequency band splitter being such as to combine signals received from the signal processing devices for transmission out through the antenna port and such as to split an incoming signal received from the antenna port to provide separate connections to respective signal processing devices.

23. A distributed antenna unit as claimed in claim 22, wherein the band splitter, for signals received from the antenna port, splits the signals into different frequency bands which are connected to respective signal processing devices.

24. A distributed antenna unit as claimed in claim 23, wherein the signal processing devices provide at least one of: signal band level adjustment; and frequency translation.

25. A distributed antenna unit as claimed in claim 24, which includes one or more separate signal processing devices for video, data acquisition and control, voice communication and data communication.

26. A distributed antenna unit as claimed in claim 24 or 25, which includes a plurality of modems for individual telephone channels connected to the main communication port, a telephone channel combiner and a telephone channel splitter, connected through repeaters and telephone interfaces to those modems, each of which has a common port connected to the frequency band splitter.

* * * * *

UNITED STATES PATENT AND TRADEMARK OFFICE
CERTIFICATE OF CORRECTION

PATENT NO. : 5,432,838
DATED : July 11, 1995
INVENTOR(S) : F. Jack Purchase, Ross A. Poole and James M. Law It is certified that error appears in the above-indentified patent and that said Letters Patent is hereby corrected as shown below:

At column 20, lines 35-36, replace "required translation in" by --, when required, translation in at least one of--

Signed and Sealed this

Twenty-ninth Day of October 1996

Attest:

BRUCE LEHMAN

*Attesting Officer*    *Commissioner of Patents and Trademarks*